Oct. 18, 1966   H. W. CHRISTENSON   3,279,745
VALVE
Filed Sept. 4, 1963   2 Sheets-Sheet 1

INVENTOR.
Howard W. Christenson
BY
A. M. Leiter
ATTORNEY

Oct. 18, 1966     H. W. CHRISTENSON     3,279,745
VALVE
Filed Sept. 4, 1963     2 Sheets-Sheet 2
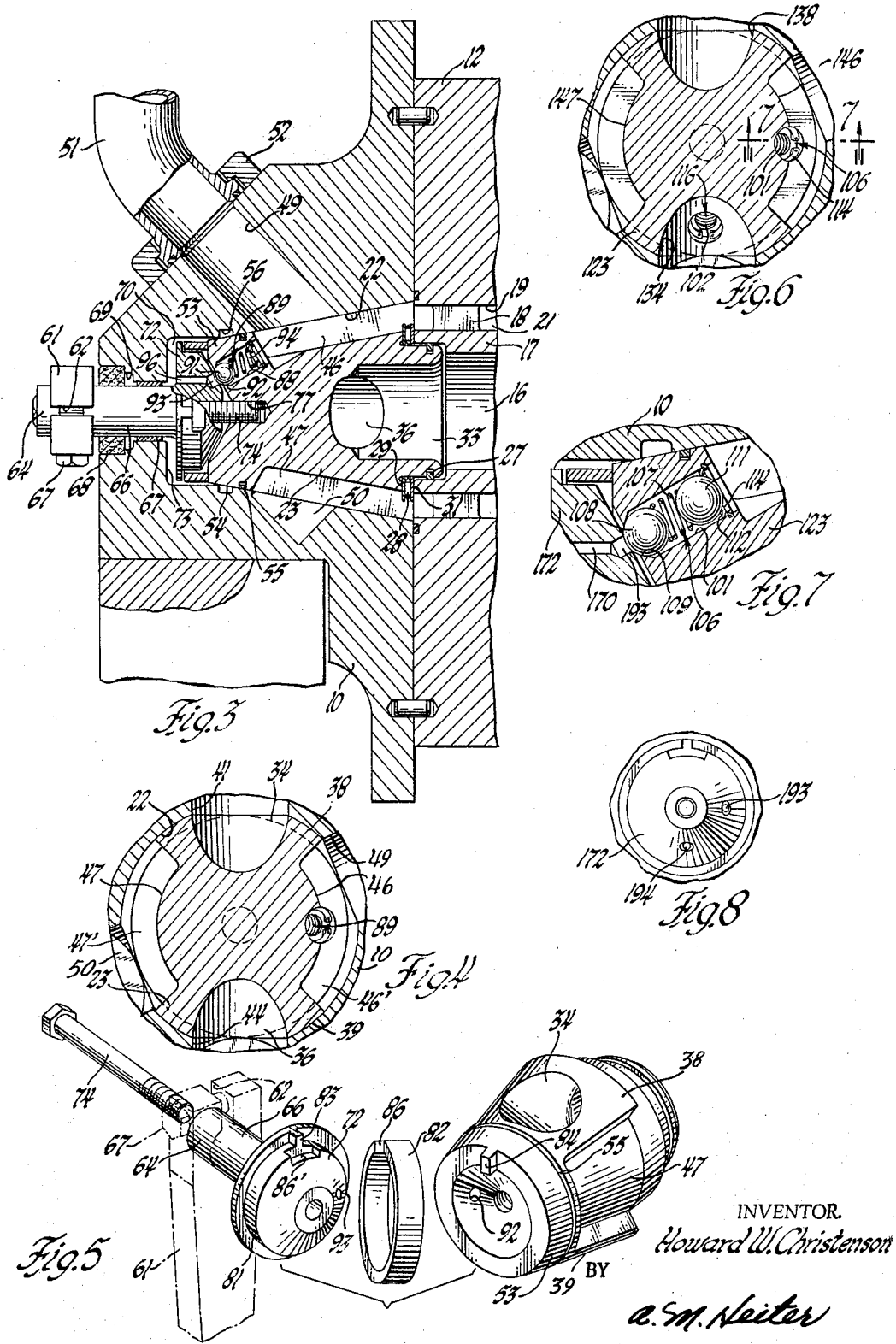
INVENTOR.
Howard W. Christenson
BY
a. M. Neiter
ATTORNEY

United States Patent Office 3,279,745  
Patented Oct. 18, 1966

3,279,745  
VALVE  
Howard W. Christenson, Indianapolis, Ind., assignor to General Motors Corporation, Detroit, Mich., a corporation of Delaware  
Filed Sept. 4, 1963, Ser. No. 306,436  
15 Claims. (Cl. 251—160)

This invention relates to valves and particularly to pressure sealing type valves.

In valves where the movable valve member is biased into engagement with the valve seat to provide a fluid seal, it is advantageous to first lift the valve member from the valve seat to break the sealing contact without any relative sliding movement between seals and thereafter rotate or laterally move the movable valve member after sealing contact has been broken to reduce the wear on the valve sealing surfaces and to provide for free valve movement. This is particularly advantageous in pressure sealing type valves where the pressure of the fluid controlled by the valve acts on one of the valve members to bias the sealing surfaces into a firm sealing relationship. In accordance with the invention, in a valve of this character, the first initial movement of the valve actuator in the control direction does not initiate relative movement of the valve members in a control direction, but first separates the sealing surfaces so that further movement of the actuator may move the valve members relative to each other to control the flow of fluid.

In the preferred form of the invention a conical plug type valve assembly is employed. The conical plug is rotatably mounted in a conical bore in the valve body. Suitable passages in the valve body and plug are aligned in the valve open position and out of alignment in the valve closed position. The pressure of the fluid controlled by the valve is employed to bias the valve plug in a valve seating direction into the conical bore of the valve body to provide a fluid type seal between the seating surfaces. The initial movement of the handle permitted by a lost motion connection between the handle and valve plug first directs a fluid pressure acting between the valve plug and valve body to lift the valve plug to separate the sealing surfaces without relative sliding movement and thereafter rotates the valve plug to a new position and directs the pressure of the controlled fluid to bias the valve plug into the sealing position.

An object of the invention is to provide in a valve assembly the combination of a valve having an actuator which, when moved in the valve operating direction, functions in its first increment of movement to separate the valve members without relative sliding and thereafter laterally move the valve members relative to each other to control the flow of fluid.

Another object of the invention is to provide a valve assembly having biasing means normally biasing the valve members in a pressure sealing relationship and a valve actuator operative on movement in a flow controlling direction to first separate the valve members directly without relative sliding movement at the sealing surfaces and thereafter to relatively move the valve members laterally with respect to each other in spaced relation to control the flow of fluid.

Another object of the invention is to provide in a valve assembly having biasing means urging the valve sealing surfaces into fluid sealing contact and valve actuator means operative during a first increment movement permitted by a lost motion connection to separate the valve sealing surfaces without relative sliding movement and thereafter to laterally move the valve elements relative to each other to control the flow of fluid.

These and other objects of the invention will be more apparent from the following description and drawing of a preferred embodiment thereof.

FIGURE 3 is a sectional view of the valve on the line 3—3 of FIGURE 1.

FIGURE 4 is a view of the valve element of FIGURE 2 on the line 4—4.

FIGURE 5 is a perspective view of the valve parts disassembled.

FIGURE 6 is a view of a modified valve element.

FIGURE 7 is a sectional view on the line 7—7 of FIGURE 6.

FIGURE 8 is a view of a modified actuator head.

Figure 1:
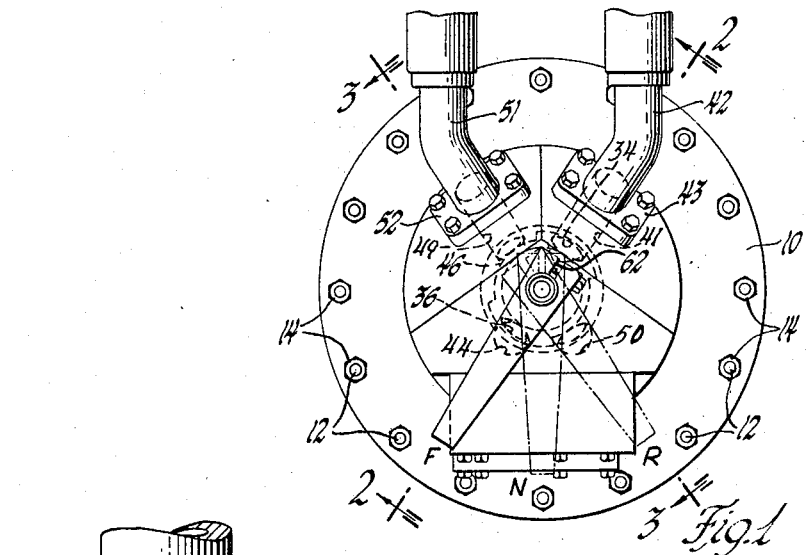
FIGURE 1 is an elevation view of the valve assembly.
Figure 2:
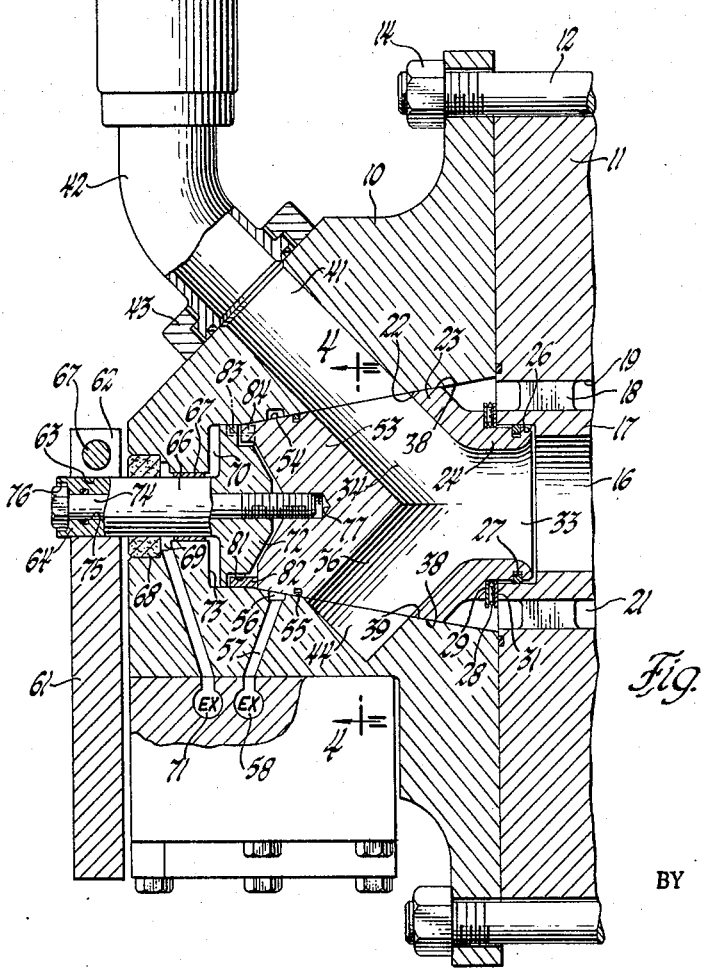
FIGURE 2 is a sectional view of the valve of FIGURE 1 on the line 2—2.

The invention is illustrated in a valve generally suitable for controlling high pressure fluid flow and particularly suitable for controlling high pressure fluid flow in hydrostatic transmissions to connect a pump to a motor for either forward or reverse drive. Referring to FIGURES 1 and 2, the pump body 10 is secured by studs or bolts 12 and nuts 14 to a cover plate 11 which provides the cover plate for the valve assembly and may also be the cover plate or end plate of a pump housing (not shown). The cover 11 thus may be a separate part or part of a pump housing secured to the valve body 10. The cover 11 has a return passage 16 defined by the annular ring 17 which is supported by webs 18 in the opening 19 in cover 11. The central opening 16 provides a low pressure or return passage while the annular space 21 between the ring 17 and cover member 11 provides the high pressure passage in which fluid under pressure flows to the conical valve bore 22 in the valve body 10. The frusto-conical movable valve member 23 has a matching conical shape to fit in the conical bore 22 and has a coaxial annular flange 24 fitting in a recess 26 in the ring 17. A sealing ring 27 fitting in a suitable groove in the flange 24 provides a seal between the valve member 23 and the ring 17. The needle bearing 28 abuts the shoulder 29 on the valve member and the end surface 31 of the ring 17.

The valve element 23 has a central bore 33 having opposed divergent branches 34 and 36 extending respectively through conical surface portions 38 and 39. The branch passage 34 in the movable valve member 23 in the first or forward position F, shown, connects the return passage 16 via passage 33—34 to the passage 41 in the valve body 10. This passage 41 is connected by suitable piping 42 secured by a pipe flange 43 bolted to the valve body 10. The other branch passage 36 is shown connected to a dummy or blind passage 44 for balancing purposes which is blocked in the housing 10, but may be extended in a manner similar to passage 41—42 if two outlets are desired. The surface portions 38—39 of the movable valve member 23 surrounding the passages 34—36, respectively, are portions of the frusto-conical surface of member 23 mating with the surface of the frusto-conical bore 22. These surfaces are sealing surfaces or sealing means to provide a seal between the supply and return passages.

Referring to FIGURE 3, it will be seen that the valve member 23 has a pair of recesses 46 and 47 located diametrically opposite each other on a diameter transverse to the diameter through the branch passages 34 and 36. These recesses 46 and 47 provide supply passages between the valve body and the valve member 23 connecting with the supply passage 19. In the first or forward position shown, the supply passage 21—46 is connected to passage 49 connected by pipe 51 secured by flange 52 to body 10. There is also a supply via passage 21—47 to a blind passage 50 opposite passage 49 to balance the valve. When the movable valve member 23 is in the neutral position N, passage 41 is connected to both passages 34 and 47 and passage 49 is connected to both passages 34 and 46 to interconnect all passages. In the reverse position R passage 41 is connected to passage 47 and passage 49 to passage 34. Also passage 36 is connected to balancing passage 50 and passage 46 is connected to balancing passage 44.

The movable valve member 23 has its small end an annular piston-like portion 53 having a frusto-conical surface 54 mating with the conical surface of bore 22. A resilient piston ring 55 is located in a ring groove in the surface 54 to contact the surface of bore 22 in sealing engagement. An exhaust groove 56 is provided in the conical surface of bore 22 centrally of the frusto-conical surface 54 of piston 53 between the ring 55 and small end so that there is cooperating annular matching conical surface portions of the piston on both sides of the exhaust groove 56 to seal against the bore. The exhaust groove 56 is connected by a suitable passage 57 to an exhaust 58 at a low pressure, i.e., atmospheric pressure or the return pressure in the system.

The actuator handle 61 has a suitable aperture 63 fitting over the stem 64 of the valve actuator member 66 and a slot 62 extending from the aperture to the end providing a bifurcated end. A bolt 67 passing through the bifurcated end of handle 61 clamps the handle 61 to the stem 64. The stem 64 is rotatably supported by bearing 67 in the housing 10. The bearing 67 also provides a restricted fluid passage from chamber 70 to exhaust groove 69 to provide a restricted exhaust. A seal 68 prevents leakage of fluid around the stem and behind the seal the annular exhaust groove 69 is suitably connected to a low pressure exhaust, i.e., an atmospheric or return pressure exhaust 71. The actuator member 66 has a head 72 located in the chamber 70 portion of bore 22 between the end wall 72 thereof and the movable valve member 23. The actuator handle 61 and member 66 is located in the assembly by a bolt 74 extending through an aperture 75 therein and having a headed portion secured in a recess 76 to prevent relative rotation between the bolt and the actuator member. The bolt is threaded into bore 77 in the valve member 23 to permit relative rotation between these parts and retain substantially constant relative axial position.

As best shown in FIGURES 2 and 5, the head member has an annular recess 81 at the outer perimeter in which the split ring 82 fits. A lug 83 on the head 72 projects half way into this recess while a similar lug 84 on the piston 53 portion of movable valve member 23 projects half way into the recess. Both of these lugs are located in the space 86 between the ends of the split ring. The lug 84 on the head 53 extends further inwardly toward the center of head 53 so that a portion therein projects into a limit stop recess 86' on the actuator head 72.

As shown in FIGURE 3, a bore 88 extends through the piston portion 53 of the movable valve member. A spring loaded ball check valve 89 located in bore 88 when closed blocks flow from high pressure passage 46 to chamber 70. With the piston 53 and the head 72 in the normal position shown, the ball 91 fits in a recess 93 permitting spring 94 to seat the ball on seat 92. The vent 96 prevents entrapped oil in the recess 93 interfering with the operation. When recess 93 is not under ball 91, the ball cannot seat and the valve is held open. The recess preferably has a circumferential width just sufficient to permit seating of the ball so that any relative movement of the actuator member 66 and valve member 23 unseats the ball.

*Operation*

In the forward position shown, high pressure fluid is supplied from a source through the annular passage 21 to the recessed passaged portion 46 between the movable valve member 23 and the body 10 to the passage 49–51 to supply fluid to a device, such as the forward inlet port of a hydrostatic transmission fluid motor. The outlet of the fluid motor during forward operation is then connected by the passage 42–41 to the return passage 34–33 in the valve body 23 to the valve outlet return passage 16. During this phase of operation, the high pressure in the passage 46 and 47 acts on the area 46'–47' of the piston 53 to provide a fluid pressure biasing force biasing the mating conical surfaces on the movable valve member 23 and the bore in the body 10 into tight sealing engagement. The space 70 in the valve bore 22 between the movable valve member 23 and the end wall 73 is at a low pressure preferably atmospheric since this space 70 is connected by a restricted fluid flow passage provided by or through the bearing 67 to the exhaust groove 69 and port 71. Thus the chamber 70 is at a lower or atmospheric pressure. The check valve 89 is seated on its seat with the ball protruding into the recess 93 so there is no fluid flow through the passage 88.

When it is desired to move the valve, the actuator handle 61 is moved from the forward position F toward the neutral and reverse positions. The snap ring 82 provides a lost motion connection between the actuator member 66 and the valve member 23, since the head 72 moves against the resilience of the snap ring spring 82 before the valve member 23 moves. Since the head 72 has a lug 83 engaging one end of the snap ring and the other end of the ring engages lug 84 on the piston 53 which cannot move due to the sealing pressure, the snap ring is loaded, resiliently resisting this movement. This movement moves the recess 93 from under the ball 91 of the check valve so that the normal surface of head 72 lifts the ball 91 from its seat permitting flow from the high pressure recess 46 to the chamber 70 where the pressure acts on the piston 53 to lift the valve member 23 out of tight contact with the bore 22 and into firm engagement with the needle bearing 28. This movement provides a pressure in chamber 70 which directly separates the seating surface 38–39 on the movable valve element from the mating seating surface of the bore 22 without relative lateral or sliding movement under high sealing pressure to permit free rotary movement of the movable valve element 23. This permits continued movement of the actuator handle 61 which through the ring 82 moves the valve member 23 to the desired position.

When movement of the actuator handle is stopped at the desired control position, neutral or reverse, the loaded spring ring 82 continues to move the valve member 23 through the lost motion position until the ball 91 drops in the recess 93. Then the high pressure in the passages 46 and 47 again firmly seats the valve member in the bore as the fluid pressure in the chamber 70 vents to exhaust 71.

During release of the high pressure surface seal to permit easy rotation of the valve element 23, a good seal is maintained between the valve element 23 and body 10 by the resilient seal 55 preferably made of Teflon and thus capable of expanding to seal the few thousandths, i.e. .003, clearance between these members to prevent leakage from the valve passages, i.e. 33, to exhaust groove 56. The conical surfaces of the valve element and body mate and thus seal on both sides of annular exhaust groove 56 so there is little leakage even when the few thousandths clearance is provided to rotate the valve element and any leakage is vented by exhaust groove 56. The conical surface seal between exhaust groove 56 and chamber 60 is sufficient so sufficient pressure to move the valve is built up in chamber 70. The pressure in chamber 70 is somewhat less than the pressure in the passages since the line pressure acting in the ports 34, 36, 46 and 47 acts on a smaller area to bias the valve to the high pressure surface sealed position than the pressure in chamber 70 acting to bias the valve to the clearance position. Thus the pressure in chamber 70 will free the valve member.

If the valve member 23 is stopped in the neutral position N, the passage 34 therein will be connected to both the passages 41 and 49 and through the latter passages to passages 46–47. Though in neutral and adjacent positions, the passages are interconnected, which may in some systems reduce the pressure controlled and thus the pressure in chamber 70, both pressures will be reduced and thus the valve member will remain in the clearance position. If the actuator handle 61 is stopped in the reverse position R, the passage 34 will be connected to the passage 49 and the passage 47 will be connected to the passage 42.

The lug 84 and the recess 86 limit the loading that can be placed on the spring ring 82, and in the event of breakage of the spring ring 82 or failure of the hydraulic unloading system, provide a positive interconnection between the actuator handle and the valve member so that the valve can be, though the force requirements are high, manually actuated.

The invention may be modified to provide the same type of pressure sealing and release of the pressure sealing when the valve element is moved when either passage has the higher pressure as shown in FIGURES 6 to 8.

The modified valve uses the same body 10 and has a valve element 123, FIG. 6, having similar ports 134, 138, 146 and 147. In the modified valve element there are two controlled passages, 101 and 102. Passage 101 connects port 146 to the chamber 170 below the valve element. Passage 102 connects port 134 to chamber 170, this chamber being the same as chamber 70, FIGURE 3.

Passage 101 is controlled by a two-way check valve 106 shown in FIGURE 7 as located in passage 101. A central spring 107 biases a controlled ball 108 to seal on seat 109 which may be formed integral with valve member 123 and also biases check valve ball 111 to engage seat 112 which is held in position by snap ring 114. A similar two-way check valve 116 is located in passage 102. The actuator head 172 is the same as actuator head 72 except that it has two recesses 193 and 194 which, like recess 93, are located to receive the controlled balls of check valves 106 and 116 when the head 172 is in the neutral position.

When the head 172 is moved against the centering force of spring 82, it moves both of the controlled balls off their seats. The high pressure fluid from one of ports 146 or 134 unseats the one check valve in the passage 101 or 102 for that one port and flows through that passage, the controlled valve being open, to the chamber 170. This fluid may also flow through the other open controlled valve to the other passage 101 or 102 but cannot flow to the connected low pressure passage since the fluid closes the other check valve. Thus the valve will function as explained in connection with the first showing regardless of which port has the higher pressure.

The invention may be modified within the scope of the appended claims.

I claim:
1. In a valve assembly;
   (a) a pair of valve members including flow control means and sealing means joined with each member and said members being mounted for relative movement in one direction in a first path into sealing position for sealing engagement of said sealing means and for movement in the opposite direction in said first path to a predetermined unsealing position of said sealing means and for movement in a second path for relative movement of said members to actuate said flow control means and said members in said unsealing position being substantially free for movement in said second path;
   (b) and actuator means connected to one of said members and being movable in a continuous path and operative in a first increment of movement to relatively move said members in said first path to said predetermined unsealing position of said members and thereafter with continued movement in said continuous path to move said members in said second path to control the flow of fluid and maintain said members in said predetermined unsealing position during movement.

2. The invention defined in claim 1 and said actuator means after moving said members to control the flow of fluid terminating movement in said second path and then moving said members in said first path for sealing engagement.

3. In a valve assembly,
   (a) a pair of valve members including flow control means and sealing means joined with each member and said members being mounted for relative movement in one direction in a first path for sealing engagement of said sealing means in a sealing position and for movement in the opposite direction in said first path for unsealing movement of said sealing means to an unsealing position and for movement in a second path for relative movement of said members to actuate said flow control means and said members in said unsealing position being substantially free for movement in said second path;
   (b) and actuator means having lost motion means including return biasing means permitting limited lost motion movement connected through said lost motion means to one of said members, said actuator means being movable in a continuous path and operative in a first increment of movement permitted by said lost motion means solely against the resistance of said return biasing means to move said one member in said first path to unsealing position and thereafter with continued movement beyond the limited lost motion movement in said continuous path to move said one member in said second path to control the flow of fluid.

4. The invention defined in claim 3 and sealing biasing means to bias said members to sealing position, and said actuator means including fluid motor means to disable said sealing biasing means, and said actuator means on lost motion movement relative to said one of said members being operatively connected to said fluid motor means to actuate said fluid motor means to disable said sealing biasing means to move said one member to unsealing position.

5. The invention defined in claim 3 and sealing means including an unbalanced area on one of said valve members and controlled means to disable said sealing biasing means including fluid motor means operatively connected to said valve members to move said valve members relative to each other in an unsealing direction and said acuator means being operatively connected to said control means to actuate said controlled means in response to lost motion movement to disable said sealing biasing means.

6. In a valve assembly;
   (a) a valve body having a conical bore with a conical surface;
   (b) a valve member having a conical surface mating with the conical surface of said conical bore providing a seal between said valve member and valve body;
   (c) fluid passage means in said valve body and valve member providing a continuous passage in one relative rotary position of said valve member with respect to said valve body and blocking said passage in another relative rotary position of said valve member with said valve body;
   (d) sealing biasing means to bias said valve member into said valve body to provide a pressure tight seal at the mating conical surfaces;
   (e) actuator means having lost motion means providing a connection to said valve member, said lost motion means including return biasing means operative in the first increment of movement permitted by said lost motion means solely against said return biasing means to disable said sealing biasing means and lift said valve member axially in said conical bore to separate said mating surfaces and break said seal, and thereafter operative with continued motion to continue to disable said sealing biasing means and to rotate said valve member in said valve body to control the passage means to control fluid flow.

7. The invention defined in claim 6 and said sealing biasing means including a first area on said valve member acted on by the fluid pressure connected by said fluid passage means, said valve member having a second larger area opposing said first area and said actuator means including fluid control means operative during movement of said actuator means to connect fluid from said fluid passage means to said second area and operative when movement ceases to exhaust fluid from said second area.

8. In a valve assembly;
   (a) a pair of valve members including a flow passage for fluid under pressure in one member, flow control passage means in the other member for controlling the flow in said flow passage and sealing means joined with each member arranged to seal said flow passage, said members being mounted for relative movement in one direction in a first path for sealing engagement of said sealing means and for movement in the opposite direction in said first path to an unsealing position of said sealing means and for movement in a second path for relative movement of said members to actuate said flow control means, and said members having means responsive to fluid under pressure in said flow passage for biasing said members in said one direction;
   (b) and actuator means including fluid motor means operative to move said members in said opposite direction, connected to one of said members and being movable in a continuous path and operative in a first increment of movement to connect said flow passage to supply fluid under pressure to said fluid motor means to move said members in said first path in said opposite direction to said unsealing position and thereafter with continued movement in said continuous path to maintain said members in said unsealing position and to move said members in said second path to control the flow of fluid.

9. The invention defined in claim 8 and said actuator means on cessation of movement disconnecting said flow passage from said fluid motor means to return said members to said sealing position.

10. In a valve assembly;
   (a) a valve body having a conical bore with a conical surface and an end closure at the small end;
   (b) a valve member located in said bore for relative axial and rotary movement and having a conical surface mating with the conical surface of said conical bore providing a surface seal between said valve member and valve body and having its small end spaced from the end closure of said valve body to provide a motor chamber having a restricted exhaust, which on the supply of fluid axially moves said valve member to a small clearance position;
   (c) bearing means between said valve body and member to limit movement at said small clearance position;
   (d) a first and a second fluid passage in each of said valve body and valve member terminating at said conical surfaces and arranged to interconnect said first passages and said second passages in one relative position, to connect one first and one second passage and the other second passage in the other first passage in a second position and to interconnect all passages in an intermediate position;
   (e) annular resilient sealing means between said valve member and valve body located between said fluid passages and said small end providing a seal in said small clearance position;
   (f) said valve member having means acted on by the fluid under pressure in said passages in said valve member to provide a biasing force to bias said valve member into said valve body to provide a pressure tight surface seal at the mating conical surfaces;
   (g) actuator means having a head located in said chamber, a handle external of said valve body rotatable to rotate said head, a projection on said head extending toward said valve member, a projection on the small end of said valve member extending toward said head, and a split ring located between said head and valve member with the projection on said head and valve member extending into said slot in said split ring to normally maintain said head and valve member in a normal relative rotary position but to permit limited relative rotary movement;
   (h) a first check valve passage connecting said first passage in said valve member to said motor chamber and a second check valve passage connecting said second passage in said valve member to said motor chamber, each of said check valve passages having a first check valve located adjacent the flow passage and pressure operated to permit flow from the connected flow passage into said check valve passage and preventing reverse flow and a second check valve located adjacent said chamber and pressure operated to prevent flow from said flow passage to said chamber and permitting reverse flow, said head and said second check valves having clearance when said head and valve member are in said normal position to permit closing of said second check valves and said head engaging said second check valves when said head is moved from said normal position to open said second check valves to permit flow from the higher pressure flow passage through the check valve passage connected thereto to said chamber to bias said valve member from said surface seal position to said small clearance position engaging said bearing means to permit easy rotary movement of said valve member.

11. In a valve assembly;
   (a) a valve body having a conical bore with a conical surface and an end closure at the small end;
   (b) a valve member located in said bore for relative axial and rotary movement and having a conical surface mating with the conical surface of said conical bore providing a surface seal between said valve member and valve body and having its small end spaced from the end closure of said valve body to provide a motor chamber, which on the supply of fluid axially moves said valve member to a small clearance position;
   (c) bearing means between said valve body and member to limit movement at said small clearance position;
   (d) passage means in each of said valve body and valve member arranged to interconnect said passage means in one relative position and to disconnect said passage means in a second position;
   (e) annular resilient sealing means between said valve member and valve body located between said fluid passage means and said small end providing a seal for said motor chamber in said small clearance position;
   (f) said valve member having means acted on by the fluid under pressure in said passages in said valve member to provide a biasing force to bias said valve member into said valve body to provide a pressure tight surface seal at the mating conical surfaces;
   (g) actuator means connected to said valve member and operative during a first increment of movement to connect said passage means to said motor chamber to move said valve member to said clearance position without rotating said valve member and operative on further movement to rotate said valve member.

12. In a valve assembly;
   (a) a body member having a conical bore with a conical surface;

(b) a valve member located in said bore of said body member for relative axial and rotary movement and having a conical surface mating with a conical surface of said conical bore providing a surface seal between said valve member and body member in a sealing position and axially movable to a predetermined unsealing axial clearance position permitting rotary movement;

(c) said body member and valve member having flow control means operative in response to relative rotary movement to control flow;

(d) actuator means connected to said body member and said valve member, normally biasing said valve member and body member into sealing position and including a controlling element movable in a continuous path and said actuator means being operative in the first increment of movement to relatively move said members axially to said predetermined axial clearance position to separate said members a predetermined axial distance and operative on continued movement to maintain said members in said predetermined axial clearance position and to relatively rotate said members to actuate said flow control means and operative on termination of movement to move said valve member and body member into sealing position.

13. In a valve assembly;
(a) valve means having sealing means movable between a sealing position and an unsealing position and flow control means more freely movable between one and another flow control positions in said unsealing position;
(b) operator means operatively connected to said valve means to move said sealing means between said sealing and unsealing positions;
(c) actuator means connected to said operator means having lost motion means including return biasing means for storing energy during lost motion movement and operative during a first increment of movement solely against the resisting force of said return biasing means to take up the lost motion of said lost motion means to store energy and to control said operator means to move said sealing means from said sealing to said unsealing position and operative during an intermediate range of movement to maintain said lost motion means in take-up position and said sealing means in said unsealing position and move said flow control means from one to another flow control position and operative on the return of the lost motion means to the initial condition due to the discharge of the stored energy to continue flow control movement of said flow control means to a terminal position and control said operator means to move said sealing means from said unsealing to said sealing position.

14. In a valve assembly;
(a) valve means having sealing means movable between a sealing position and an unsealing position and flow control means more freely movable between one and another flow control positions in said unsealing position;
(b) operator means operatively connected to said valve means to move said sealing means between said sealing and unsealing positions;
(c) lost motion means including return biasing means for storing energy during lost motion take-up movement and discharging energy during return movement;
(d) actuator means connected by said lost motion means to said operator means and said flow control means operative during a first increment of movement solely against the resistance of said return biasing means to take up the lost motion of said lost motion means to store energy and to control said operator means to move said sealing means from said sealing to said unsealing position and operative during an intermediate range of movement to maintain said lost motion means in take-up position and said sealing means in said unsealing position and move said flow control means from one to another flow control position and at the termination of movement said return biasing means being operative to return the lost motion means to the initial condition to discharge the stored energy to continue flow control movement of said flow control means to a terminal position and control said actuator means to move said sealing means from said unsealing to said sealing position.

15. In a valve assembly;
(a) valve means having sealing means movable between a sealing position and a movable position and flow control means more freely movable between one and another flow control positions in said movable position with a low resistance to movement;
(b) a source of power;
(c) power operator means operatively connected to said valve means to move said sealing means between said sealing and movable positions;
(d) lost motion means having return biasing means for providing lost motion movement in response to a predetermined force not greater than said low resistance;
(e) actuator means connected to said power operator means by said lost motion means operative in a first increment of movement solely against the resisting force of said return biasing means to take up the lost motion of said lost motion means and on continued movement to move said flow control means from one to another flow control position;
(f) means responsive to said first increment of movement of said actuator means operatively connected to said power source and power operator means to connect said power source to said power operator means to move said sealing means from said sealing to said movable position;
(g) and said lost motion means being responsive to termination of movement of said actuator means to disconnect said power source from said power operator means to move said sealing means to said sealing position.

References Cited by the Examiner

UNITED STATES PATENTS

| | | | |
|---|---|---|---|
| 1,494,793 | 5/1924 | Linaker | 251—163 |
| 1,558,979 | 10/1925 | Guillery | 251—163 |
| 2,222,626 | 11/1940 | Mueller | 251—163 |
| 2,923,320 | 2/1960 | Anderson | 251—175 X |

M. CARY NELSON, *Primary Examiner.*

W. CLINE, *Assistant Examiner.*

UNITED STATES PATENT OFFICE
CERTIFICATE OF CORRECTION

Patent No. 3,279,745                                 October 18, 1966

Howard W. Christenson

It is hereby certified that error appears in the above numbered patent requiring correction and that the said Letters Patent should read as corrected below.

Column 3, line 9, for "has its" read -- has at its --; column 6, line 43, for "sealing means" read -- sealing biasing means --; line 49, for "control" read -- controlled --.

Signed and sealed this 12th day of September 1967.

(SEAL)
Attest:

ERNEST W. SWIDER                              EDWARD J. BRENNER
Attesting Officer                                  Commissioner of Patents